(12) United States Patent
Kato

(10) Patent No.: US 7,600,107 B2
(45) Date of Patent: Oct. 6, 2009

(54) DEVICE DRIVER, PROGRAM FOR CUSTOMIZING THE DRIVER, INFORMATION PROCESSING APPARATUS, AND INFORMATION PROCESSING METHOD

(75) Inventor: Hisashi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 11/376,945

(22) Filed: Mar. 16, 2006

(65) Prior Publication Data

US 2006/0224876 A1 Oct. 5, 2006

(30) Foreign Application Priority Data

Mar. 29, 2005 (JP) .............................. 2005-095696

(51) Int. Cl.
*G06F 15/177* (2006.01)
(52) U.S. Cl. ................................ 713/1; 713/2; 713/100
(58) Field of Classification Search ..................... 713/1, 713/2, 100
See application file for complete search history.

(56) References Cited

U.S. PATENT DOCUMENTS

| 5,581,766 A * | 12/1996 | Spurlock | 713/2 |
| 2005/0204355 A1 * | 9/2005 | Yoda et al. | 717/176 |
| 2006/0072140 A1 * | 4/2006 | Mitani | 358/1.13 |
| 2006/0170943 A1 * | 8/2006 | Hanson et al. | 358/1.13 |

FOREIGN PATENT DOCUMENTS

| JP | 2003-150341 A | 5/2003 |
| JP | 2003-271321 A | 9/2003 |

* cited by examiner

*Primary Examiner*—Thomas Lee
*Assistant Examiner*—Fahmida Rahman
(74) *Attorney, Agent, or Firm*—Canon U.S.A. Inc., I.P. Division

(57) ABSTRACT

An information processing apparatus, in which a device driver program including operational configuration information is installed, includes a determining unit that reads confirmation indicating information to determine whether presence of consistency between the operational configuration information and actual device configuration information, which is configuration information of a device to be driven and controlled, is to be confirmed, upon installation of the device driver program in the information processing apparatus; an acquiring unit that acquires the actual device configuration information from the device, subsequent to the installation, if the determining unit determines that presence of the consistency is to be confirmed; a consistency confirming unit that determines whether there is consistency between the operational configuration information and the actual device configuration information; and a warning unit that transmits a warning message to a user if the consistency confirming unit determines that there is no consistency.

6 Claims, 11 Drawing Sheets

```
From : Customization Tool
To : Administorator@XXXX.co.jp
Subject : Customized Driver <xxxx> Notification of Inconsistent Settings Device driver installed in PC704 has inconsistent settings.

LBP-XXXX
Duplexer unit : None
Duplex setting : ON
```

DEVICE DRIVER, PROGRAM FOR CUSTOMIZING THE DRIVER, INFORMATION PROCESSING APPARATUS, AND INFORMATION PROCESSING METHOD

BACKGROUND OF THE INVENTION

1. Field of the Invention

The present invention relates to device drivers used by host devices, such as computers, to control peripheral devices, such as printers, in computer systems that include the host devices and the peripheral devices. In particular, the present invention relates to a device driver capable of customizing default operational configuration information when the device driver is installed in a host device and to a program for customizing the device driver.

2. Description of the Related Art

Computer peripheral devices are individually controlled by the corresponding device drivers installed in computers that execute the device drivers. An exemplary computer peripheral device is a printer. A printer driver controls a printer to be driven and controlled on the basis of operational configuration information that is set. The operational configuration information includes information concerning, for example, duplex printing and a page layout. When the printer driver is installed in a computer, the preset operational configuration information is used as default values (initial values). However, the default values do not necessarily match the actual configuration and operating environment of the printer and, therefore, the operational configuration information should be set in accordance with the configuration and operating environment of the printer.

Japanese Patent Laid-Open No. 2003-150341 discloses an installer of a device driver, which allows a user to select options of restricting control functions in installation of the device driver and to interactively set the control functions within the selected options.

However, even in the installer disclosed in Japanese Patent Laid-Open No. 2003-150341, the operational configuration information should be changed to values appropriate for the configuration and environment of each computer. Accordingly, this installer is not suitable for bulk installation of computers and collective management by a system administrator. Even when the default values set at the time of installation are customized, different printers may have different configurations and environments. Hence, it is necessary to determine whether the default values of the operational configuration information of the installed printer driver are consistent with the configuration and environment of the corresponding printer. In addition, some users want to restrict the use of the functions implemented in the printer in order to restrict the functions used by end users. The same applies to common peripheral devices, in addition to the printer drivers.

SUMMARY OF THE INVENTION

The present invention provides a device driver, which is capable of changing the default values of operational configuration information of the device driver and in which the change of the default values of the operational configuration information in accordance with the configuration and environment of a device to be driven is compatible with application of the default values of the operational configuration information independently of the configuration and environment of the device to be driven, and a program for customizing the device driver.

According to an aspect of the present invention, an information processing apparatus in which a device driver program including operational configuration information is installed includes: a determining unit configured to read confirmation indicating information to determine whether presence of consistency between the operational configuration information and actual device configuration information, which is configuration information of a device to be driven and controlled, is to be confirmed, upon installation of the device driver program in the information processing apparatus; an acquiring unit configured to acquire the actual device configuration information from the device to be driven and controlled, subsequently to the installation, if the determining unit determines that presence of consistency is to be confirmed; a consistency confirming unit configured to determine whether there is consistency between the operational configuration information, which is set and held in the device driver program in advance, and the actual device configuration information; and a warning unit configured to transmit a warning message to a user if the consistency confirming unit determines that there is no consistency between the operational configuration information and the actual device configuration information.

According to another aspect of the present invention, an information processing apparatus capable of customizing operational configuration information of a device driver includes: a reading unit configured to read a driver set for installing the device driver; an editing unit configured to edit default operational configuration information used in installation of the device driver in the driver set read by the reading unit; a setting unit configured to set confirmation indicating information indicating whether presence of consistency between the operational configuration information and actual device configuration information, which is configuration information of a device to be driven and controlled, is to be confirmed upon installation of the device driver, and a writing unit configured to store the confirmation indicating information and the operational configuration information edited by the editing unit in the driver set for installing the device driver.

According to another aspect of the present invention, an information processing method for an information processing apparatus in which a device driver program including operational configuration information is installed includes: reading confirmation indicating information to determine whether presence of consistency between the operational configuration information and actual device configuration information, which is configuration information of a device to be driven and controlled, is to be confirmed, upon installation of the device driver program in the information processing apparatus; acquiring the actual device configuration information from the device to be driven and controlled, subsequently to the installation, if it is determined that presence of the consistency is to be confirmed; determining whether there is consistency between the operational configuration information, which is set and held in the device driver program in advance, and the actual device configuration information; and transmitting a warning message to a user if it is determined that there is no consistency between the operational configuration information and the actual device configuration information.

According to yet another aspect of the present invention, an information processing method for an information processing apparatus capable of customizing operational configuration information of a device driver includes: reading a driver set for installing the device driver; editing default operational configuration information used in installation of the device driver in the driver set; setting confirmation indicating information indicating whether presence of consistency between the operational configuration information and actual device configuration information, which is configuration information of a device to be driven and controlled, is to be confirmed upon installation of the device driver; and writing the confirmation indicating information and the edited operational configuration information in the driver set for installing the device driver.

According to still another aspect of the present invention, a computer-readable storing medium has stored thereon a device driver program including computer-executable instructions and operational configuration information readable by a computer for performing a method including: reading predetermined confirmation indicating information to determine whether presence of consistency between the operational configuration information and actual device configuration information, which is configuration information of a device to be driven and controlled, is to be confirmed, upon installation of the device driver program in the computer; acquiring the actual device configuration information from the device to be driven and controlled, subsequently to the installation, if it is determined that presence of consistency between the operational configuration information and actual device configuration information is to be confirmed; confirming whether there is consistency between the operational configuration information, which is set and held in the device driver program in advance, and the actual device configuration information; and transmitting a warning message to a user if it is determined that there is no consistency between the operational configuration information and actual device configuration information.

According to yet another aspect of the present invention, a computer-readable storing medium has stored thereon a customizing program that is capable of customizing operational configuration information of a device driver, the customizing program including computer-executable instructions for performing a method including: reading a driver set for installing the device driver; editing default operational configuration information used in installation of the device driver in the driver set read in the reading step; setting confirmation indicating information indicating whether presence of consistency between the operational configuration information and actual device configuration information, which is configuration information of a device to be driven and controlled, is to be confirmed upon installation of the device driver; and writing the confirmation indicating information and the edited operational configuration information in the driver set for installing the device driver.

According to the present invention, it is possible to determine whether the actual device configuration information is acquired from the device to be driven, before the device is driven and controlled by the device driver, to meet various need of users. In the acquisition of the actual device configuration information, the warning message can be displayed, if the default values of the customized operational configuration information are inconsistent with the configuration of the device to be driven, to indicate the inconsistency to the users. Furthermore, if the actual device configuration information is not to be acquired, the default values of the operational configuration information can be applied to the device without change to restrict available functions.

Further features of the present invention will become apparent from the following description of exemplary embodiments with reference to the attached drawings.

DESCRIPTION OF THE EMBODIMENTS

First Exemplary Embodiment

Structure of Printing System

Figure 1:
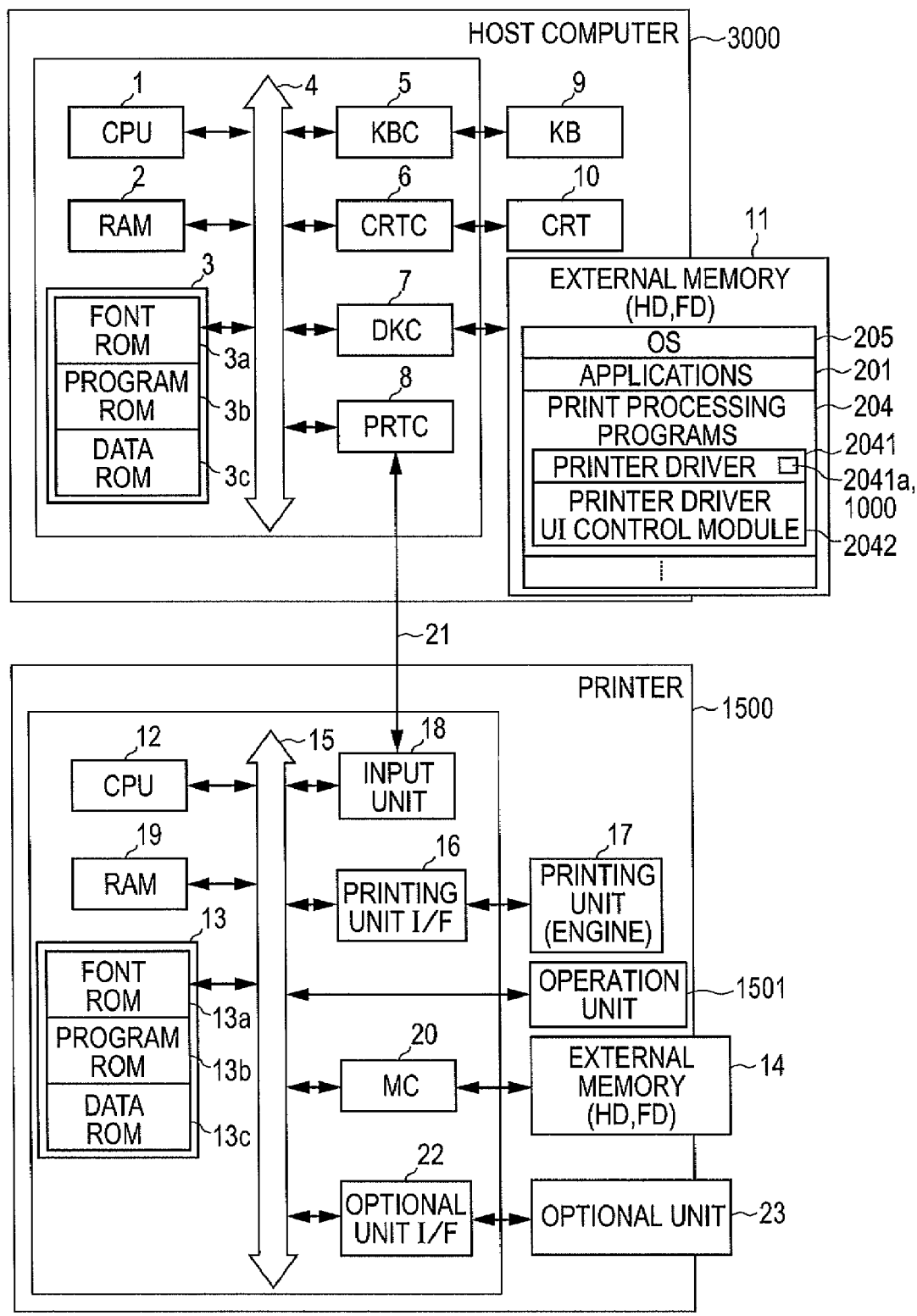
FIG. 1 is a block diagram showing an example of the structure of a print processing system according to an exemplary embodiment of the present invention.

A first exemplary embodiment according to the present invention will be described in detail with reference to the attached drawings. FIG. 1 is a block diagram showing an example of the structure of a print processing system according to the first exemplary embodiment. The print processing system includes a host computer 3000 (an information processing apparatus) and a printer 1500 (a printing apparatus) that receives print data from the host computer 3000 and prints the received print data.

In the host computer 3000, a central processing unit (CPU) 1 controls components connected to a system bus 4 in accordance with programs stored in a random access memory (RAM) 2. The RAM 2 also serves as a main memory and a work area of the CPU 1. A read only memory (ROM) 3 stores various programs and a variety of data. The ROM 3 includes a font ROM 3a that stores various fonts, a program ROM 3b that stores, for example, a boot program and a basic input/output system (BIOS), and a data ROM 3c that stores the variety of data.

A keyboard controller (KBC) 5 controls an input operation with a keyboard (KB) 9 or a pointing device (a mouse) (not shown). A cathode-ray tube controller (CRTC) 6 controls display in a cathode-ray tube (CRT) display 10. A disk controller (DKC) 7 controls access to an external memory 11, such as a hard disk. A printer controller (PRTC) 8 is connected to the printer 1500 through a bidirectional interface 21 and performs communication control between the host computer 3000 and the printer 1500.

The external memory 11 is, for example, a hard disk (HD), a magneto-optical (MO) disk, or a flexible disk (FD). The external memory 11 stores an operating system (OS) 205, various applications 201 (for example, a document processing application program that processes documents including graphics, images, characters, and tables), print processing programs 204, user files, edit files, and others, as shown in FIG. 1. The print processing programs 204 generate print data described in a page-description language (PDL) and can be shared by multiple printers of the same family. The print processing programs 204 include a printer driver 2041 with a software module generating printer control commands, and a printer driver user-interface (UI) control module 2042. The external memory 11 also stores print setup information 2041a, which is operational configuration information for printing operation. The print setup information 2041a includes information that indicates specifications of, for example, duplex printing, a layout (the page layout on a surface of a sheet medium), a paper feed tray to be used, a sheet orientation (portrait or landscape), the type of paper, a printing order (ascending or descending order), bookbinding, and superimposition of water-marks. Moreover, the external memory 11 stores a driver information file 1000 (also referred to as configuration definition information or a user-interface printer description (UPD) file) that holds default values (initial values) of the print setup information 2041a.

The applications 201, which are stored in the external memory 11 and include a customization tool program (hereinafter simply referred to as a customization tool) according to the first exemplary embodiment, are loaded in the RAM 2 and are executed by the CPU 1. The CPU 1 performs rendering (rasterizing) of outline fonts in the RAM 2 and enables WYSIWYG (what you see is what you get) on the CRT display 10. The CPU 1 also opens various registered windows in accordance with a command designated with, for example, a mouse cursor (not shown) on the CRT display 10 to perform a variety of data processing. In the printing, a user opens a print setup screen, which is controlled by the printer-driver UI control module 2042, to set up the printer 1500 and to change the print settings, including selection of a print mode, for the printer driver 2041.

The structure of the printer 1500 will now be described. In the printer 1500, a CPU 12 controls components connected to a system bus 15. A RAM 19 serves as a main memory and a work area of the CPU 12 and is used as an output information loading area and an environmental data storage area. The RAM 19 includes a nonvolatile RAM (NVRAM), and the capacity of the RAM 19 can be expanded with an optional RAM connected to an expansion port (not shown). A ROM 13 is divided into a font ROM 13a that stores various fonts, a program ROM 13b that stores, for example, a control program executed by the CPU 12, and a data ROM 13c that stores a variety of data. An input unit 18 sends and receives data to and from the host computer 3000. A printing unit interface 16 controls interface with a printing unit 17, which is a printer engine.

An external memory 14 is, for example, an HD, an MO, an FD, or an integrated circuit (IC) card, that is connected to the printer 1500 as an optional component. The external memory 14 stores font data, an emulation program, form data, and so on. Access to the external memory 14 is controlled by a memory controller (MC) 20. In a case where the external memory 14, such as the HD, is not connected to the printer 1500, information used in the host computer 3000 is stored in the data ROM 13c in the ROM 13. The printer 1500 may include multiple external memories 14. For example, multiple external memories that store an optional font card, in addition to built-in fonts, and programs for translating printer control languages in different languages may be connected to the printer 1500.

An operation unit 1501 includes an operation panel that accepts the user's operation. The operation panel has operation switches, a light emitting diode (LED) indicator (not shown), and others. The operation unit 1501 may include an NVRAM (not shown) that stores printer mode setup information input via the operation panel.

The CPU 12 supplies an image signal (output information) to the printing unit 17 via the printing unit interface 16 in accordance with a control program, etc. stored in the program ROM 13b in the ROM 13. The CPU 12 is capable of establishing communication with the host computer 3000 via the input unit 18. Specifically, the CPU 12 is capable of receiving the print data transmitted from the host computer 3000 and transmitting information stored in the printer 1500 to the host computer 3000.

An optional unit interface 22 is an interface with an optional unit 23 connected to the printer 1500. The optional unit 23 is, for example, a duplexer unit that provides a mechanism for reversing paper for duplex printing, a paper feed unit that can stock a number of sheets of paper, a sorter that sorts ejected paper, or a finisher unit that performs, for example, stapling and perforating. The optional unit 23 is not necessarily connected to the printer 1500. The printer 1500 is provided with a sensor that detects any connection of the optional unit 23 to the printer 1500. Accordingly, the printer 1500 transmits the configuration information including that of the optional unit 23 to the host computer 3000, in response to a request to send the configuration information from the host computer 3000, if the optional unit 23 is connected to the printer 1500.

Figure 2:
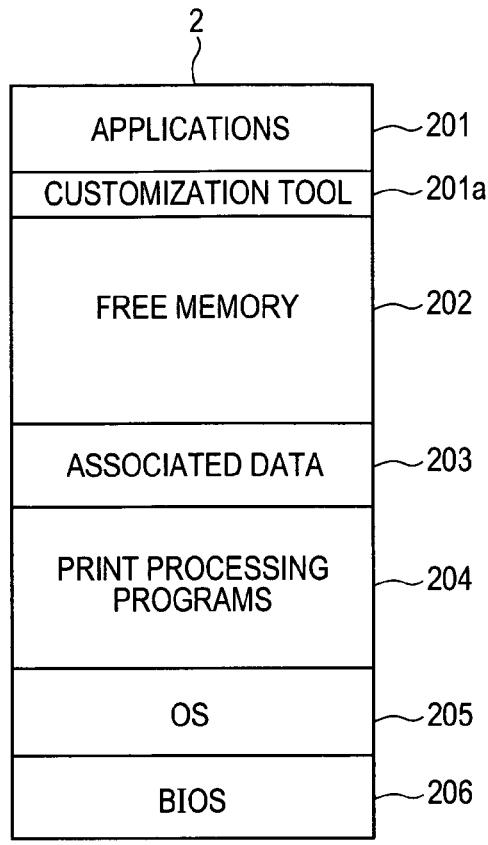
FIG. 2 shows a memory map of a random access memory (RAM) according to the exemplary embodiment of the present invention.

FIG. 2 shows an exemplary memory map of the RAM 2 in the host computer 3000 in a state in which programs and data are loaded in the RAM 2 by activating predetermined applications including the customization tool according to the embodiment of the present invention and the print processing programs 204.

Referring to FIG. 2, a BIOS 206, the OS 205, the applications 201, the print processing programs 204, and associated data 203 are loaded in the RAM 2. A free memory area 202 is also reserved in the RAM 2. In the state shown in FIG. 2, the applications 201 and the print processing programs 204 are ready to be executed. The printer-driver UI control module 2042 (FIG. 1) included in the print processing programs 204 displays the print setup screen on the CRT display 10 in response to the user's print setup instruction and allows the user to perform the print setup with, for example, the KB 9. The print processing programs 204 also include the printer driver 2041. A customization tool 201a is a program for customizing the printer driver and is loaded in the RAM 2 before installation as one of the applications 201. The executable module (program) of the customization tool 201a may be removed from the RAM 2 after the printer driver 2041 is customized. Accordingly, the customization tool 201a and the printer driver 2041 customized by the customization tool 201a need not exist concurrently in the RAM 2. The customization tool 201a and the printer driver 2041 are collectively referred to as a printer driver set.

Content of UPD File

Figure 9:
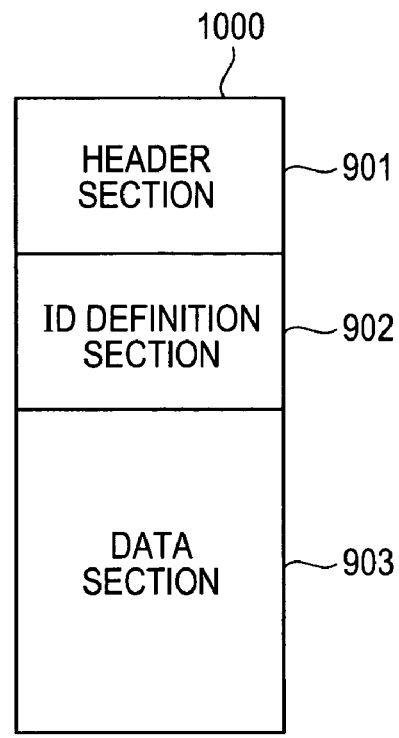
FIG. 9 illustrates the data format of a user-interface printer description (UPD) file, which includes configuration definition information, according to the exemplary embodiment of the present invention.

FIG. 9 illustrates the data format of the UPD file 1000, which includes the configuration definition information. As shown in FIG. 9, the UPD file 1000 has a header section 901, an identification (ID) definition section 902, and a data section 903. Pairs of the IDs of pieces of data stored in the data section 903 and the addresses of the pieces of data are stored in the ID definition section 902. Accordingly, the number of the pairs of data stored in the ID definition section 902 corresponds to the number of IDs. Since the UPD files are provided for every printer driver, i.e., for every type of printer, it is possible to perform the customization in different manners in different types of printers.

In the case of the UPD file customized by the customization tool, the ID definition section 902 includes a predetermined ID (for example, "CUSTOMIZED") that indicates that the UPD file is customized and a default value and an address X of the position where the data is stored. In the case of the UPD file that is not customized by the customization tool, the ID definition section 902 does not include an ID indicating that the UPD file is customized. Hence, it is possible to determine whether the UPD file is customized by referring to the ID definition section 902.

In addition, since the ID definition section 902 uses IDs for customization, the printer driver of a new version can inherit the settings of the printer driver that has been customized.

Figure 10:
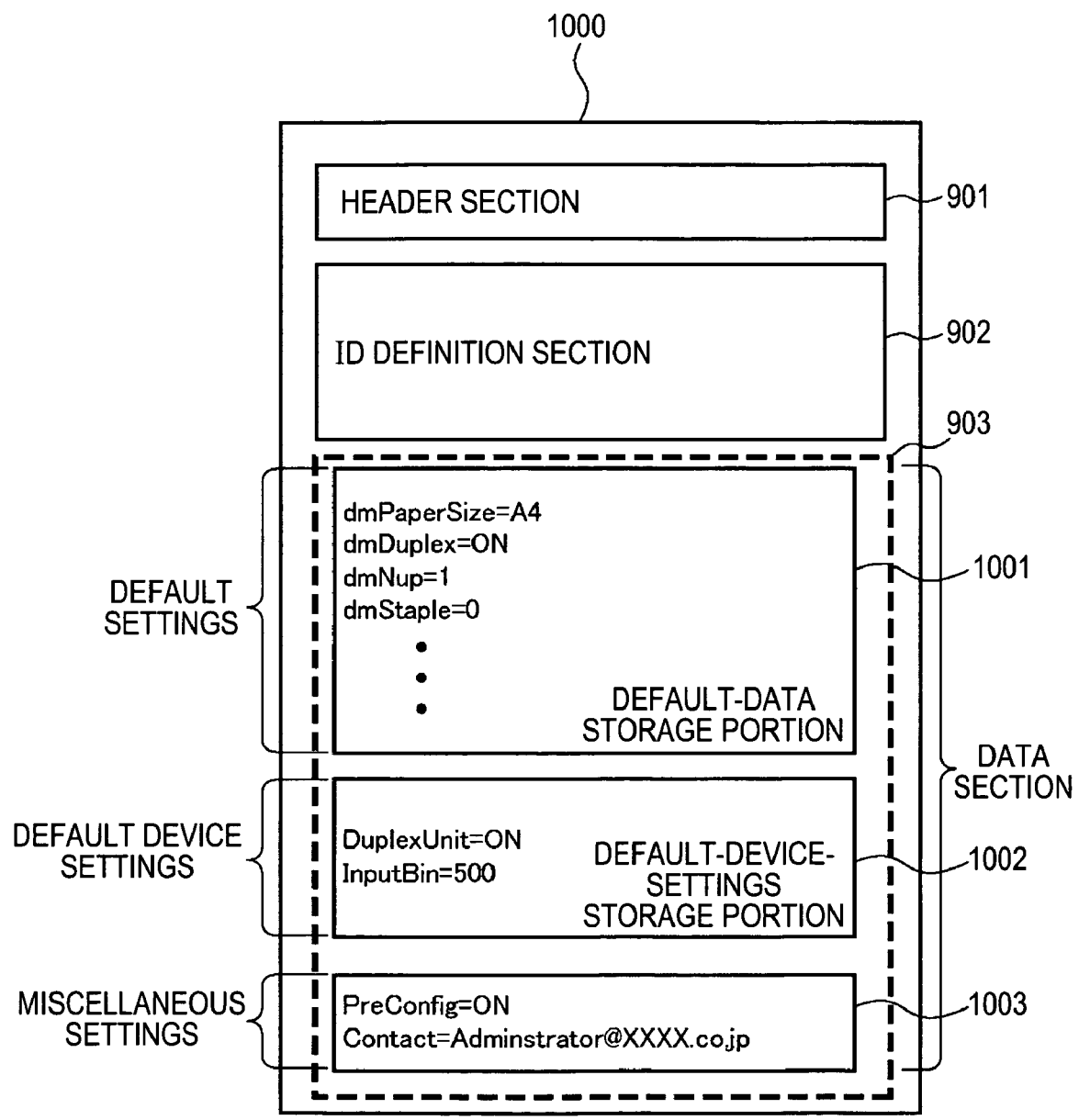
FIG. 10 is a diagram showing a customized UPD file according to the exemplary embodiment of the present invention.

FIG. 10 shows an exemplary customized UPD file 1000. Referring to FIG. 10, the data section 903 in the UPD file 1000 includes a default-data storage portion 1001 in which default values (that is, initial values) used in the print setup are stored, a default-device-settings storage portion 1002 in which default values of device configuration information are stored, and a miscellaneous-settings storage portion 1003 in which miscellaneous settings set by a user with check buttons or text boxes in the user interface (UI) of the printer driver are stored. The default-device-settings storage portion 1002 includes the device configuration information set in the customization. The device configuration information stored in the default-device-settings storage portion 1002 is set independently of the configuration of the device in which the printer driver is installed and which is to be driven and controlled. The default values of the device configuration information are stored in the default-device-settings storage portion 1002 in the data structure in a device mode. The data structure in the device mode is used for managing the device configuration information of the printer to be used.

In the default-data storage portion 1001 in the example shown in FIG. 10, a setup parameter dmDuplex corresponding to the screen setup is set to "ON" and a setup parameter dmNup corresponding to the page layout is set to "1". These values indicate that duplex printing is turned on and that the number of pages per one side of a sheet is set to one as the layout setting.

In the default-device-settings storage portion 1002, a configuration parameter DuplexUnit corresponding to a duplexer unit is set to "ON" and a configuration parameter InputBin corresponding to a paper source unit is set to "500". These values indicate that the duplexer unit is provided and that the capacity of the paper source unit is 500 sheets of paper.

The miscellaneous-settings storage portion 1003 includes a parameter PreConfig and a parameter Contact. The parameter PreConfig indicates whether the printer driver confirms the configuration information (referred to as actual device configuration information) of the installed device. The parameter Contact indicates information concerning a destination to which a warning message is sent if the actual device configuration information is inconsistent with the configuration information stored in the default-device-settings storage portion 1002. The warning message is sent via, for example, e-mail. Referring to FIG. 10, the parameter PreConfing is set to "ON" and the parameter Contact is set to "Administrator@XXXX.co.jp". These values indicate that the actual device configuration information is to be confirmed and that the destination of the warning message is "Administrator@XXXX.co.jp".

The data section 903 may further include information identifying parameters having settings that the user is not allowed to change. When the user uses the customization tool to specify parameters having settings that the user is not allowed to change, the information identifying the parameters is stored in the data section 903. The parameters of the settings that the user is not allowed to change are displayed in, for example, gray in the UI of the printer driver such that the settings are not selected or input.

Customization Process

Figure 8:
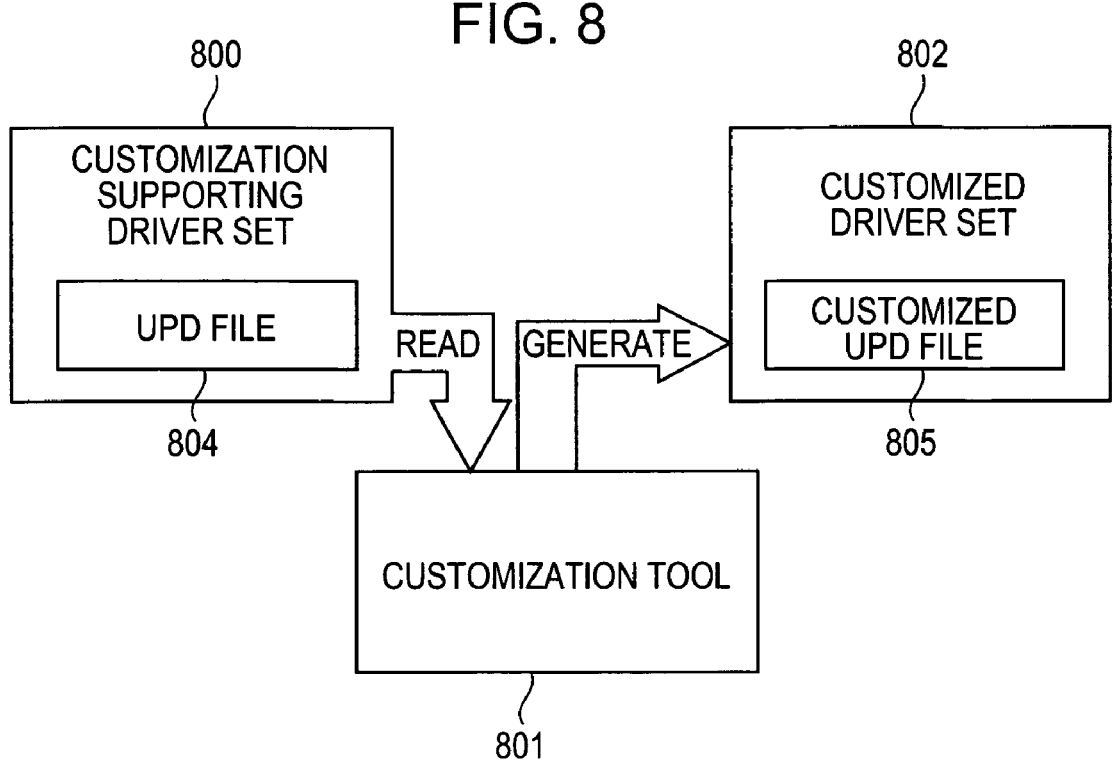
FIG. 8 shows a process of customizing a printer driver according to the exemplary embodiment of the present invention.

FIG. 8 shows a process of customizing the printer driver according to the first exemplary embodiment of the present invention. In the customization of the printer driver according to the first exemplary embodiment, upon installation, the UPD file can be edited to customize print setup items, the settings of which the user is allowed to change, in addition to the default print setup values. The process of customizing the printer driver as shown in FIG. 8 includes a customization supporting driver set 800 that supports the customization with a customization tool 801 (which corresponds to the customization tool 201a), and a customized driver set 802. The user invokes the customization tool 801 and writes the customization supporting driver set 800, which is to be customized and which is stored in the external memory 11, in a memory or the like with the customization tool 801. The customization supporting driver set 800 includes a program code file of the printer driver and a UPD file 804. The customization tool 801 edits the UPD file 804, which is written in, for example, the RAM, in accordance with a customization setup operation by the user. After the customization setup is completed, the customization tool 801 generates the customized driver set 802 including a customized UPD file 805 and stores the generated customized driver set 802 in the external memory 11.

The customization supporting printer driver reads the customized UPD file 805 with the customization tool 801 upon completion of the installation or at first startup. The printer driver refers to the ID definition section 902 in the UPD file 1000 and reads the default data that is stored in the data section 903 in association with the ID indicating that the UPD file 1000 is customized.

For example, in the case of the UPD file customized by the customization tool, the ID definition section 902 includes a predetermined ID (for example, "CUSTOMIZED") that indicates that the UPD file is customized and a default value and the address X of the position where the data is stored. In the case of the UPD file that is not customized by the customization tool, the ID definition section 902 does not include an ID indicating that the UPD file is customized.

Upon completion of the installation or at first startup, if the ID information indicating "CUSTOMIZED" is stored in the ID definition section 902, the customization supporting printer driver in the customized driver set 802 reads out data at the address stored in association with the ID information. The readout data is used as the default values of the print setup information. Accordingly, upon completion of the installation or at first startup, if the ID "CUSTOMIZED" is included in the ID definition section 902, the customization supporting printer driver reads out the address X of the data from the ID definition. The printer driver first reads out the default values of the print setup information stored in the default-data storage portion 1001 and, then, reads out the default values of the device configuration information stored in the default-device-settings storage portion 1002. Addresses are allocated to both the default-data storage portion 1001 and the default-device-settings storage portion 1002 so as to be referenced with respect to the address X. For example, the default-data storage portion 1001 and the default-device-settings storage portion 1002 are located at addresses given by adding predetermined offsets to the address X.

The address X may be an absolute address. Alternatively, the first address of the data section 903 may be stored in the header section 901 and an offset address from the first address of the data section 903 may be set to the address X.

Figure 11:
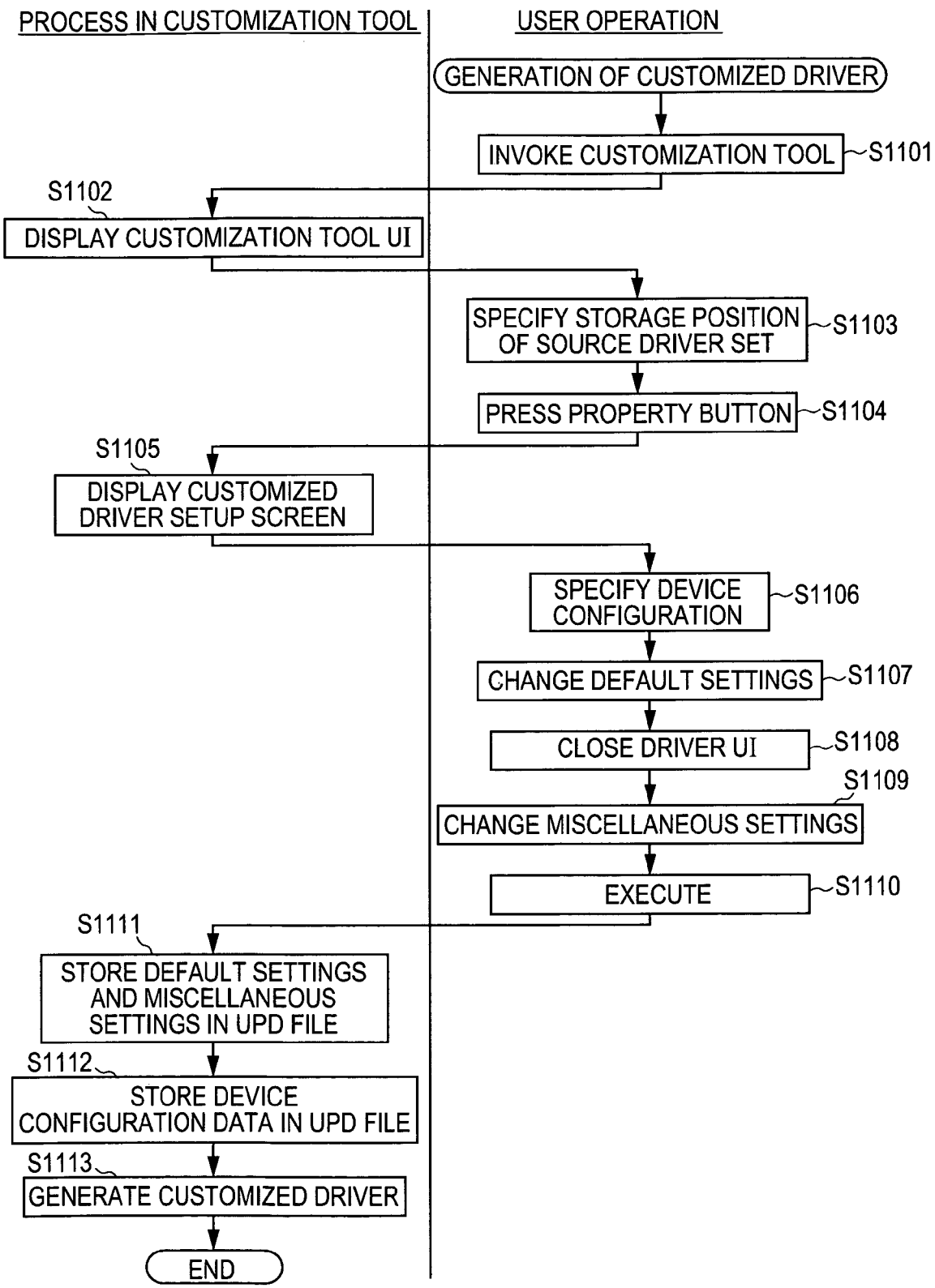
FIG. 11 is a flowchart showing a process of generating a customized printer driver, according to the exemplary embodiment of the present invention.

FIG. 11 is a flowchart showing operations by the user (the right side in FIG. 11) and a process in the customization tool 801 (the left side in FIG. 11), when the customization tool 801 in FIG. 8 is used to generate a customized driver. A process of generating the customized driver will now be described with reference to FIG. 11.

In Step S1101, the user invokes the customization tool 801. In Step S1102, the customization tool 801 displays a UI, such as the one shown in FIG. 3.

Figure 3:
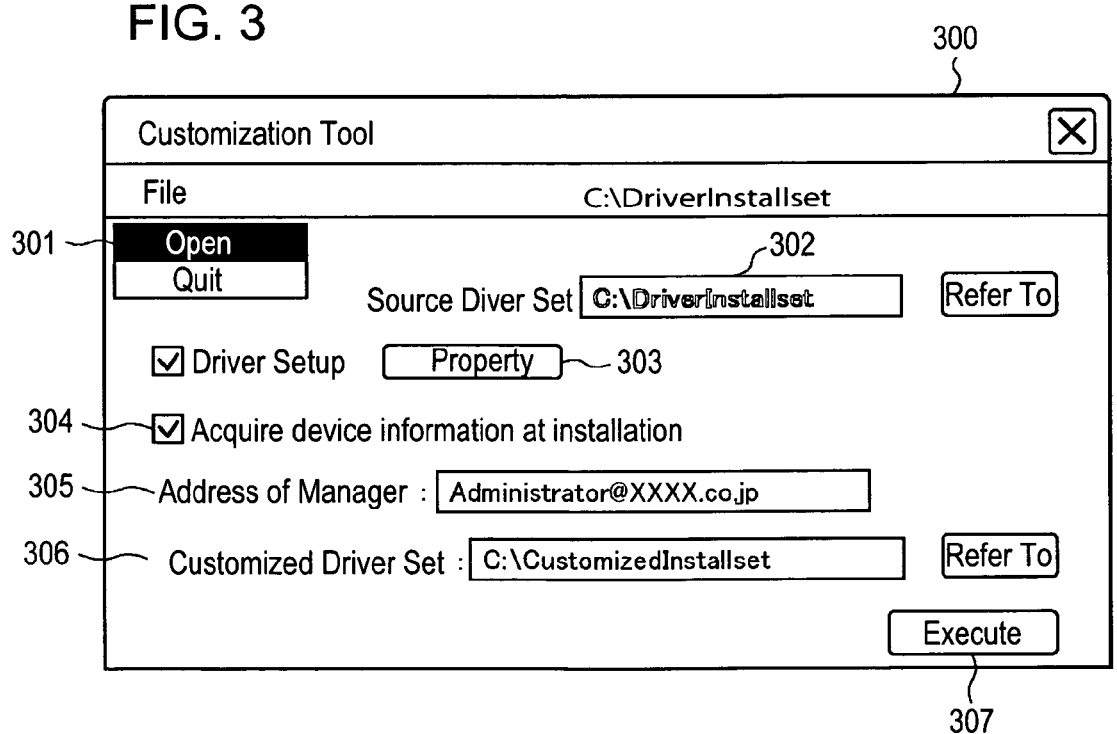
FIG. 3 shows an example of a user interface of a customization tool according to the exemplary embodiment of the present invention.

FIG. 3 shows an example of a UI of the customization tool 801. The UI includes a "Customization Tool" window 300, a menu 301 for the storage position of the driver set, a text box 302 indicating the storage position of a source driver set (particularly the UPD file) supporting the customization, a property button 303 used for displaying a customized driver setup screen in which default values of the print setup information are set, a check box 304 used for specifying whether the device configuration information is acquired in the installation of the printer driver, a text box 305 used for specifying the address of a manager, a text box 306 used for specifying the storage position of the customized driver set, and an "Execute" button 307 used for executing the generation of the customized driver.

Figure 4:
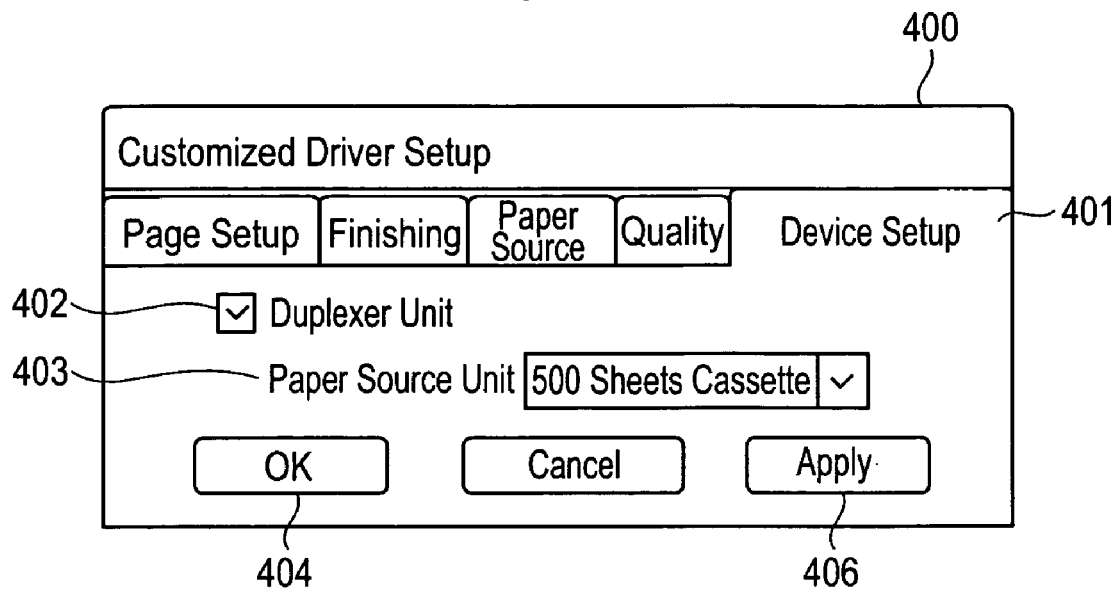
FIG. 4 shows an example of a customized driver setup screen according to the exemplary embodiment of the present invention.

In Step S1103, the user specifies the storage position of the source driver set in a dialog box (not shown) opened by pressing "Open" button in the menu 301. The specified storage position and the name of the driver set are displayed in the text box 302. After the source driver set is determined, in Step S1104, the user presses the property button 303. The determined driver set (including the driver information file (dynamic link library (DLL)), the configuration definition information file (UPD file), and an installation definition file (INF file)) is read and, in Step S1105, the customization tool 801 displays a "Customized Driver Setup" screen 400, such as the one shown in FIG. 4.

When the "Customized Driver Setup" screen 400 is displayed, the user selects a "Device Setup" sheet 401 to make the "Device Setup" sheet 401 active and, in Step S1106, the user specifies the device configuration, which is a prerequisite for the print setup to be customized. In the example in FIG. 4, a "Duplexer Unit" check box 402 is checked and "500 Sheets Cassette" is specified in a "Paper Source Unit" combo box 403. The user presses an "Apply" button 406 or an "OK" button 404 to establish the device settings. It is presumed here that the "Apply" button 406 is pressed to continue the process. The parameters indicating the result of the user operation are temporarily stored.

Figure 5:
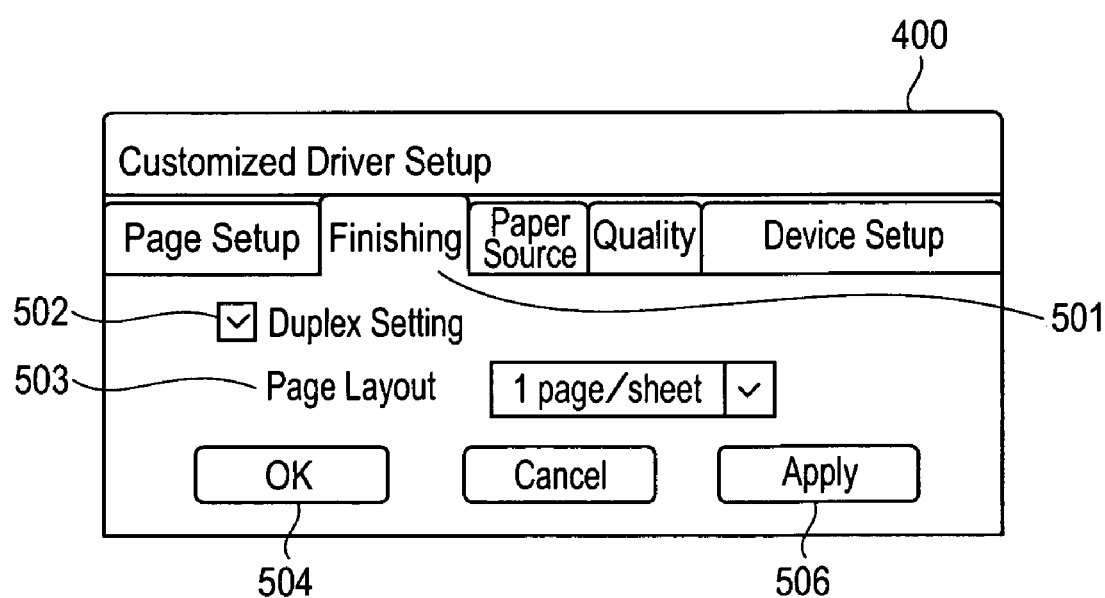
FIG. 5 shows another example of a customized driver setup screen according to the exemplary embodiment of the present invention.

After the device configuration is set, in Step S1107, the user can select an arbitrary sheet on the "Customized Driver Setup" screen 400 to change the default settings to desired driver settings. In the example shown in FIG. 5, a "Finishing" sheet 501 is selected, in which a "Duplex Setting" check box 502 is checked and "1 page/sheet" is specified in a "Page Layout" setting 503.

After the print setup information of the driver has been edited, an "OK" button 504 or an "Apply" button 506 is pressed to establish the finishing settings. In the exemplary embodiment, the user presses the "OK" button 504 because the process is not continued and, in Step S1108, the user closes the "Customized Driver Setup" screen 400. The parameters indicating the result of the user operation are temporarily stored.

Since the "Customization Tool" window 300 is displayed again after the "Customized Driver Setup" screen 400 is closed, in Step S1109, the user can change miscellaneous settings. In the example shown in FIG. 3, the check box 304 used for specifying whether the configuration information of the device to be used is acquired in the installation of the customized driver is checked, and the e-mail address of the manager is specified in the text box 305 used for specifying the address of the manager. After the storage position of the driver set is specified in the text box 306, in Step S1110, the user presses the "Execute" button 307. The customization tool 801 executes the generation of the customized driver set.

In Steps S1111 and S1112, the customization tool 801 reflects the settings specified and changed in Steps S1106, S1107, and S1109 in the UPD file 804 on the basis of the parameters that are temporarily stored and stores the UPD file 804 as part of the customized driver set. In Step S1113, the customization tool 801 generates the customized driver set 802 including the customized UPD file 805 generated in Steps S1111 and S1112. In the customized UPD file, the pair of the ID indicating that the UPD file is customized and the address of the data is stored in the ID definition section 902, and the parameters set in accordance with the operation on the UI screen are stored at the location indicated by the address, as described above with reference to FIGS. 9 and 10. For example, when the "Duplexer Unit" check box 402 is checked on the "Device Setup" sheet 401, the parameter DuplexUnit set to "ON" is stored in the data section 903 in the UPD file 1000. As a result, the default values of the customized print setup information and the default values of the device configuration information are stored in the data section 903 in the UPD file 1000.

The customization tool according to the first exemplary embodiment of the present invention assigns the ID defined for the customization to the customized data, and stores the values of the customized data in association with the ID. If the ID of the customized data to be used is not defined in the ID definition section 902, a new ID corresponding to the customized data is added to the ID definition section 902. The customized data should have, for example, an ID other than the ID corresponding to the default value before the customization. If the ID corresponding to the default data before the customization is set to a predetermined value, the ID that has a value smaller than the predetermined value and that is unique to the corresponding default data should be defined for the customization.

The printer driver, particularly the UPD file, can be customized in the manner described above. The customized printer driver reads out the UPD file generated by the customization tool, upon completion of the installation or at first startup, and operates on the basis of the customization information. Accordingly, it is possible to easily create the operating environment of the customized printer driver. The customization tool according to the first exemplary embodiment of the present invention writes data concerning the initial values used in the device setup in the "Device Setup" sheet 401 shown in FIG. 4, data concerning the initial values used in the print setup in the "Finishing" sheet 501 and others, shown in FIG. 5, data indicating whether the device information is acquired upon installation, specified with the check box 304, and the address of the manager, in the UPD file as the customized data.

Installing Customized Driver

Figure 7:
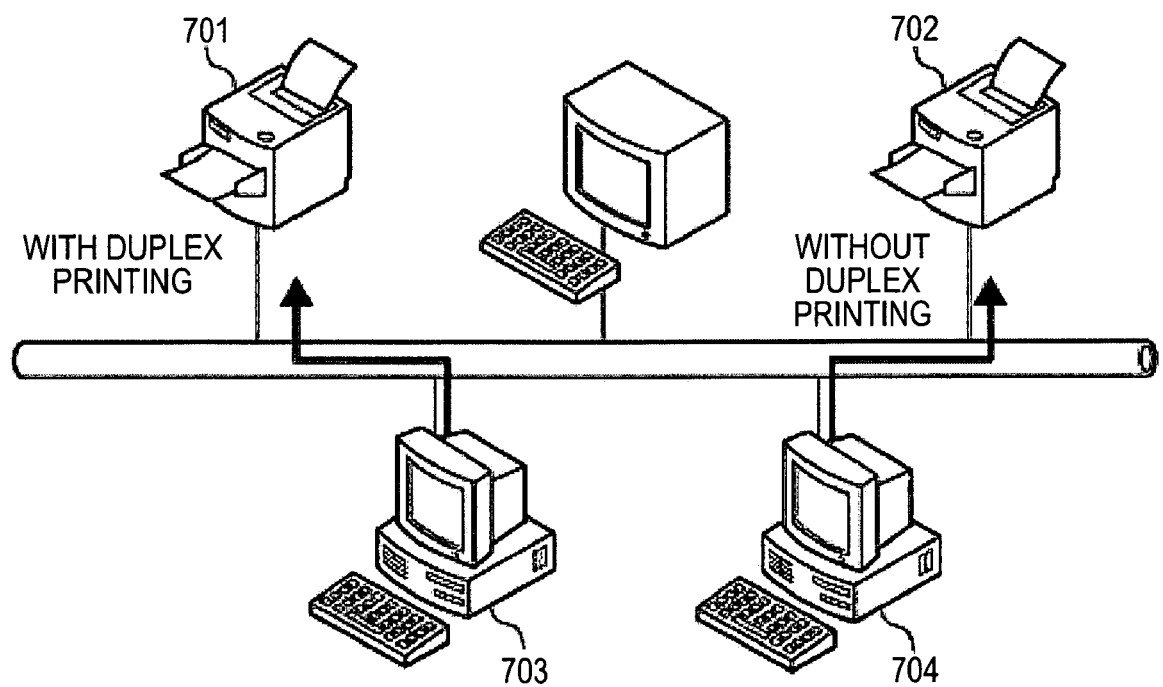
FIG. 7 shows an example of a user environment according to the exemplary embodiment of the present invention.

FIG. 7 shows an exemplary user environment in which a customized driver is used. The user environment shown in FIG. 7 includes a device 701 having the duplexer unit mounted therein and a device 702 that does not have a duplexer unit mounted therein. The devices 701 and 702 are driven and controlled by printer drivers of the same type, that is, have the same model. A user operating a personal computer (PC) 703 uses the device 701 with the duplex printing function. A user operating a PC 704 uses the device 702 without the duplex printing function.

Figure 12:
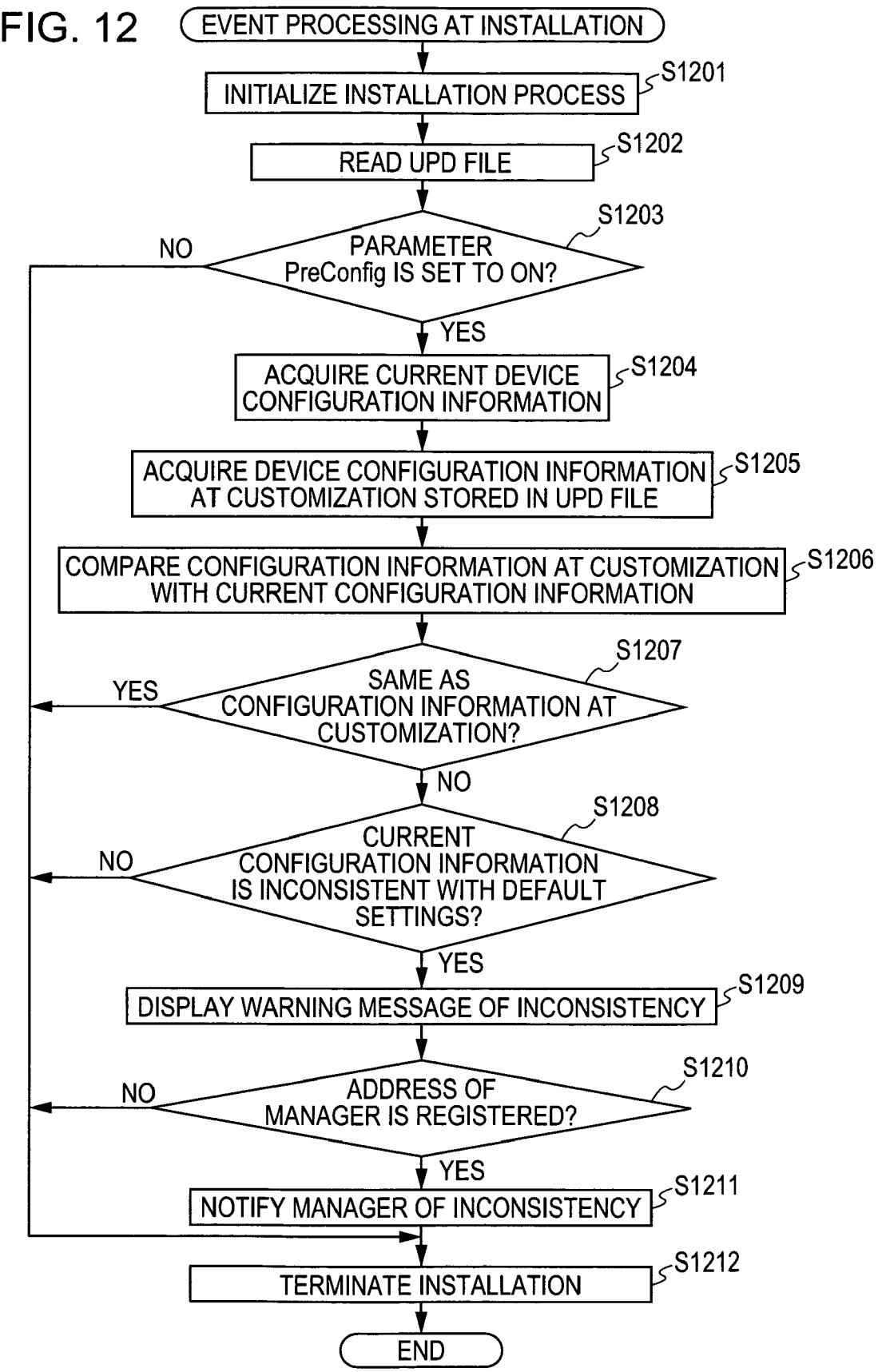
FIG. 12 is a flowchart showing a process performed when the customized printer driver is installed, according to the exemplary embodiment of the present invention.

FIG. 12 is a flowchart showing a process performed in a customization supporting driver, when the manager delivers the customized driver set 802 generated in the flowchart shown in FIG. 11 to the user who installs the customized driver set 802 in the PC. The same flowchart is used when the manager installs the customized driver set 802 by remote control. It is presumed here that the customized driver sets of the same type are installed in the PCs 703 and 704 in the user environment shown in FIG. 7.

The installation is started by the user who uses an "Add" button of the printer to specify an INF file for the customized driver set. The INF file is used for automatically executing an installation script in a Windows® environment. The process is performed in the Windows® environment in the first exemplary embodiment of the present invention. However, the present invention can be embodied in other operating systems in the same manner as in the first exemplary embodiment, although different installation programs are used.

In the installation of the printer, the user operating the PC 703 specifies a port of the device 701 and the user operating the PC 704 specifies a port of the device 702. The devices 701 and 702 may be locally connected devices, such as line printers (LPs) or universal serial bus (USB) printers. Or, the devices 701 and 702 may be network-connected printers that are connected via, for example, Transmission Control Protocol/Internet Protocol (TCP/IP) ports.

After the installation is started, a configuration file (for example, the UPD file or the driver program file) included in the customized driver set described in the INF file is copied in a predetermined system folder. After the required file is copied in the system folder, a system spooler invokes an event processing function in the driver and, in Step S1201, the installation process is initialized. In the initialization process, for example, a process of generating a required registry is performed.

After the initialization process, in Step S1202, the customization supporting driver reads the UPD file copied in the system folder. For example, the data in the data section 903 in FIG. 10 is mapped to the RAM 2.

In Step S1203, the customization supporting driver refers to the data in the data section 903, read in Step S1202, to confirm the value of a parameter PreConfig. The parameter PreConfig indicates whether acquisition of the configuration information upon installation is effective. If the customization supporting driver determines in Step S1203 that the parameter PreConfig is set to "OFF", that is, if the customization supporting driver determines that the acquisition of the configuration information upon installation (and the confirmation of the current device configuration information) is not effective, the customization supporting driver proceeds to Step S1212 to terminate the installation process.

Figures 15, 16:
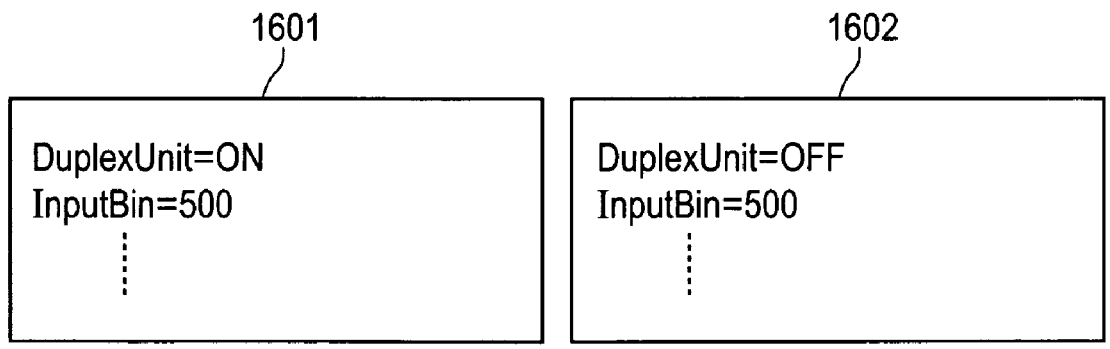
FIG. 15 shows an example of an inconsistent setting notification mail according to the exemplary embodiment of the present invention.
FIG. 16 shows examples of device configuration information according to the exemplary embodiment of the present invention.

Since the parameter PreConfig is set to "ON" in the example shown in FIG. 10, the process proceeds to Step S1204. In Step S1204, the customization supporting driver requests the device configuration information from the printer that is connected and acquires the current device configuration information. The acquired device configuration information is mapped to the RAM 2. FIG. 16 shows examples of device configuration information 1601 and device configuration information 1602 acquired from the device 701 and the device 702, respectively. Since the device 701 has the duplexer unit mounted therein, the parameter "DuplexUnit" is set to "ON" in the device configuration information 1601. Since the device 702 does not have the duplexer unit mounted therein, the parameter DuplexUnit is set to "OFF" in the device configuration information 1602.

In Step S1205, the customization supporting driver acquires the default values of the device configuration information in the default-device-settings storage portion 1002 from the data in the UPD file read in Step S1202. In Step S1206, the customization supporting driver compares the current device configuration information acquired in Step S1204 with the device configuration information in the UPD file, acquired in Step S1205, i.e., the device configuration information set in the generation of the customized driver. Specifically, the current device configuration information shown in FIG. 16 is compared with the device configuration information in the data section 903 in FIG. 10.

In Step S1207, the customization supporting driver determines whether the device configuration information set in the generation of the customized driver coincides with the current device configuration information, on the basis of the result in Step S1206. If the customization supporting driver determines in Step S1207 that the device configuration information set in the generation of the customized driver does not coincide with the current device configuration information, the customization supporting driver proceeds to Step S1208. If the customization supporting driver determines in Step S1207 that the device configuration information set in the generation of the customized driver coincides with the current device configuration information, the customization supporting driver proceeds to Step S1212 and terminates the process. For example, in the user environment shown in FIG. 7, since it is determined that the customized driver installed in the PC 703 has the same configuration as in the generation of the customized driver, the customization supporting driver terminates the process. In contrast, since it is determined that the customized driver installed in the PC 704 has a configuration different from that in the generation of the customized driver, the customization supporting driver proceeds to Step S1208.

In Step S1208, the customization supporting driver determines whether the default values of the print setup information stored in the UPD file shown in FIG. 10 are inconsistent with the current device configuration information. For example, the parameter dmDuplex for the duplex setting is set to "ON" in the default-data storage portion 1001 while the parameter DuplexUnit is set to "OFF" in the current device configuration information of the device 702. In this case, the customization supporting driver determines in Step S1208 that the default values of the customized driver installed in the PC 704 are inconsistent with the current device configuration information. In the detection of the inconsistency, the inconsistency in the settings in the program may be detected or a rule of inconsistent settings may be stored in a separate file. In either case, items to be compared with each other are determined in advance and it is determined that there is inconsistency if the values of the items do not coincide with a certain value. For example, a pair of the name of an item (parameter identifier) having the inconsistency and the value of the item may be registered in a table. Alternatively, a pair of the name of an item having the consistency and the value of the item may be registered in the table. There is inconsistency if the parameter DuplexUnit does not have the same value as the parameter dmDuplex for the duplex setting. Accordingly, the customization supporting driver determines in Step S1208 that there is inconsistency if, for example, a pair of the parameter DuplexUnit being set to "ON" and the parameter dmDuplex being set to "OFF" and a pair of the parameter DuplexUnit being set to "OFF" and the parameter dmDuplex being set to "ON" are registered in advance and either pair is effective.

Examples of inconsistent settings include a case where a finishing setting, such as stapling, is set as the default value while a finishing unit is not provided (the inconsistency in the settings of the optional unit), and cases where paper feeding from a non-existent paper source unit is set and where printing on a sheet of paper having a non-printable size is set (the inconsistency in the paper feeding settings).

Figure 6:
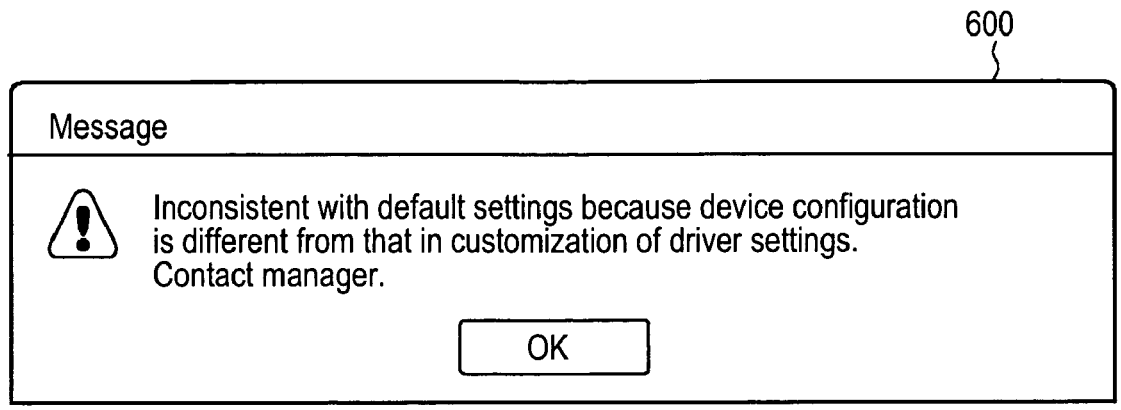
FIG. 6 shows an example of a warning message in device setup according to the exemplary embodiment of the present invention.

If the customization supporting driver determines in Step S1208 that there is inconsistency, as in the PC 704, the customization supporting driver proceeds to Step S1209 to display a warning message 600 such as the one shown in FIG. 6 indicating that there is inconsistency. Otherwise, the customization supporting driver proceeds to Step S1212 to terminate the installation process.

In exemplary embodiments, in Step S1209, information indicating which setting has the inconsistency is described in the waning message. For this purpose, a warning message indicating the name of the inconsistent item and the content of the inconsistency is registered in the table used for determining the inconsistency in a user-recognizable format, and the warning message is displayed if it is determined that there is inconsistency.

If the customization supporting driver determines that there is inconsistency, the customization supporting driver displays the address of the manager. Specifically, after the user presses the "OK" button in the warning message 600, in Step S1210, the customization supporting driver determines whether information concerning the address of the manager is stored in the miscellaneous-settings storage portion 1003. If the information concerning the address of the manager is stored in the miscellaneous-settings storage portion 1003, the customization supporting driver proceeds to Step S1211 to transmit a message, such as an electronic mail (e-mail) message, such as the one shown in FIG. 15, to the stored address and, then, proceeds to Step S1212 to terminate the installation process. The content of the mail may be stored in the miscellaneous-settings storage portion 1003 along with the information concerning the address of the manager or a fixed message may be displayed. However, the mail includes at least the name (identifier) of a computer and the name (identifier) of a printer, which have inconsistent settings.

If the customization supporting driver determines in Step S1210 that the information concerning the address of the manager is not stored in the miscellaneous-settings storage portion 1003, the customization supporting driver proceeds to Step S1212 to terminate the installation process.

The installation of the customized printer driver is performed in the manner described above. According to the first exemplary embodiment of the present invention, it is determined upon installation whether the default values of the print setup information are inconsistent with the configuration information of the printer to be driven and controlled by the driver, in accordance with presence of the specification whether the determination is to be performed. Hence, if there is the specification, it is possible to recognize the inconsistency only in the computer corresponding to the inconsistent printer through the warning message. In contrast, if there is no specification, it is possible to allow the computer to use the default values of the print setup information independently of the configuration information of the printer. As a result, the default values of the print setup information can be efficiently matched with the configuration of the printer. In addition, it is possible to allow the user to use the default print settings without change. Furthermore, it is possible to select the matching with the configuration of the printer or the usage of the default print settings.

Example of Default Value in Print Setup

Figure 13:
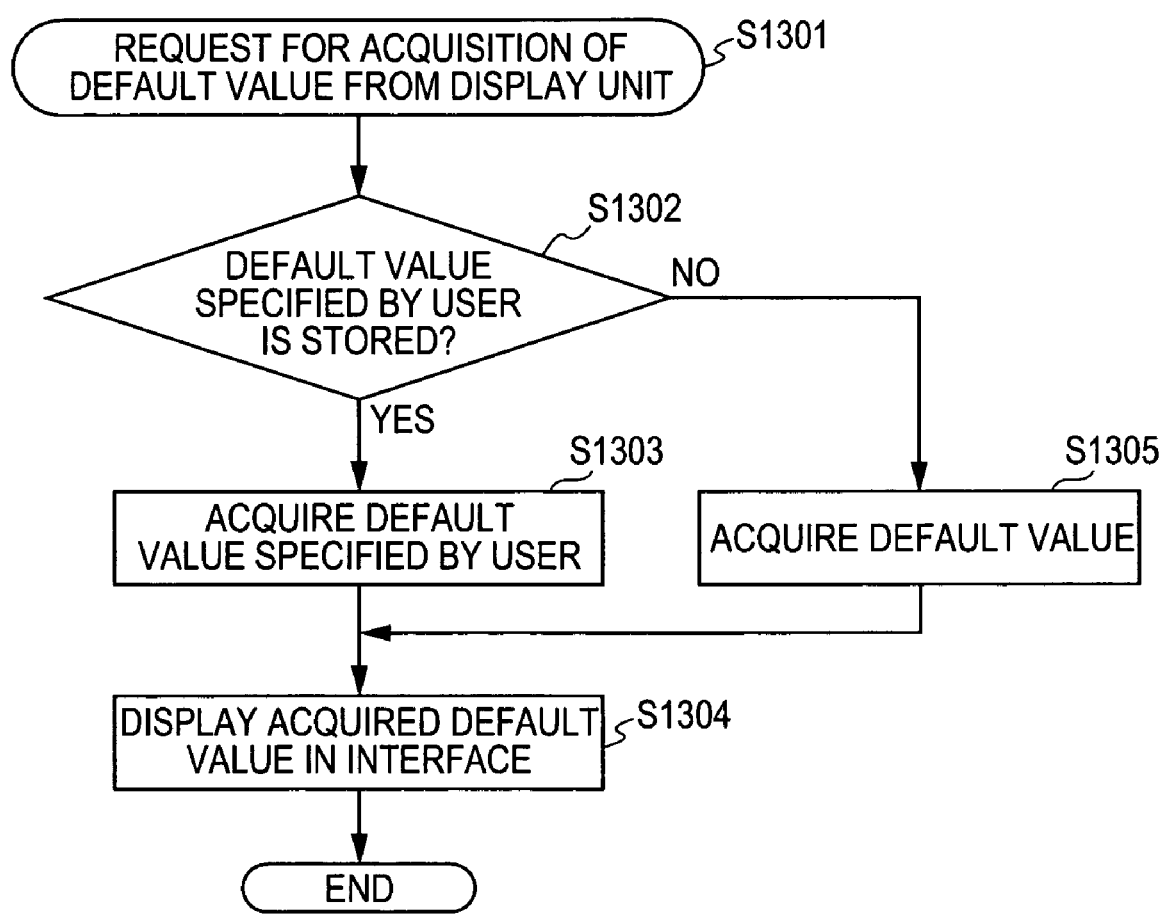
FIG. 13 is a flowchart showing a process of displaying values in a user interface of the customized printer driver, according to the exemplary embodiment of the present invention.
Figure 14:
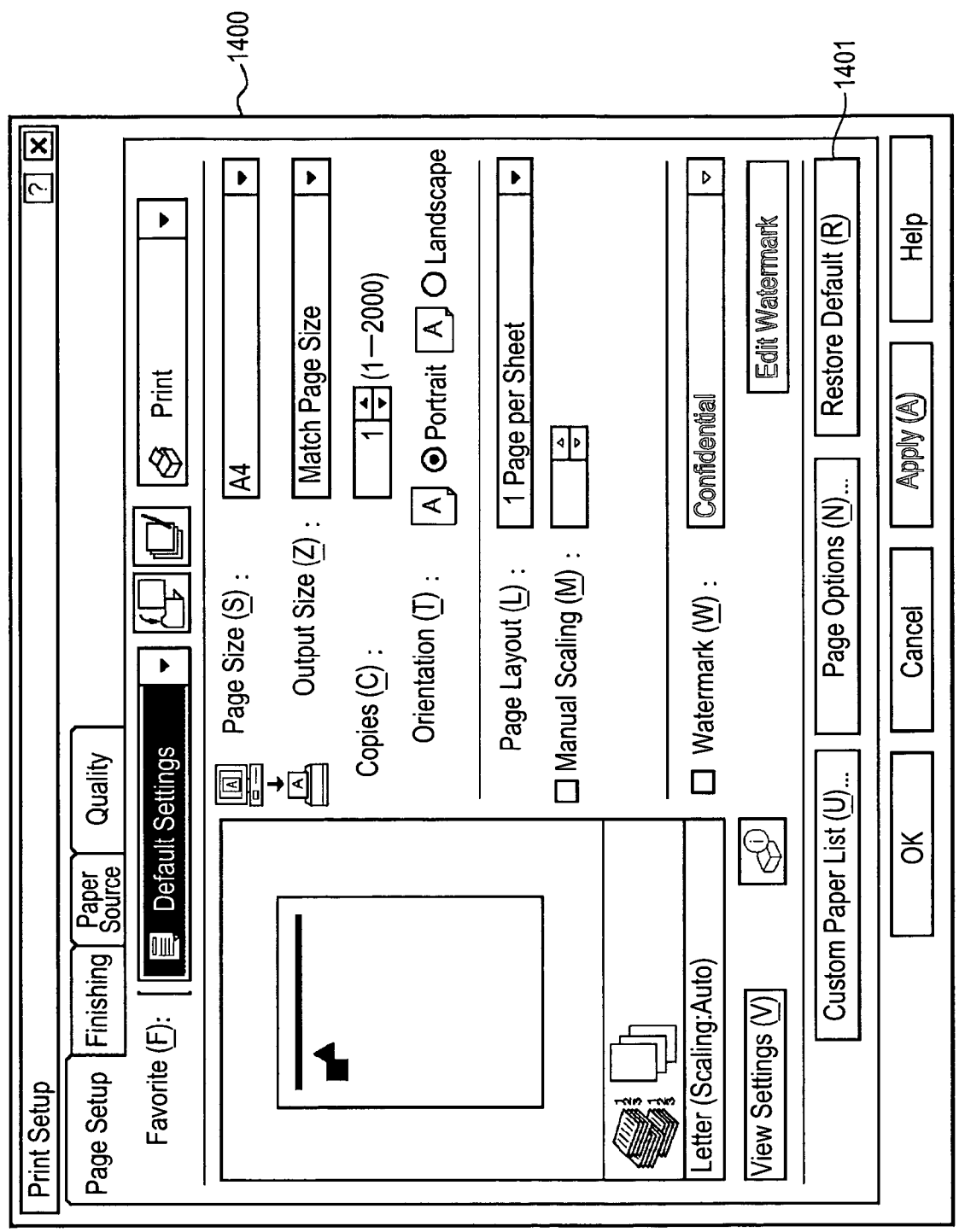
FIG. 14 shows an example of a print setup screen according to the exemplary embodiment of the present invention.

FIG. 14 shows an example of "Print Setup" screen 1400 when the printer driver UI control module 2042 is executed. When the "Print Setup" screen 1400 is first displayed or a "Restore Default" button 1401 is pressed, after the customized driver set 802 is installed in the computer, the default values of the print setup information (also referred to as default data) are displayed. The print processing programs 204 in FIG. 2, particularly, the printer driver UI control module 2042 reads out the default values of the print setup information from the data section 903 in the UPD file, shown in FIG. 9, to copy the default values in the print setup information 2041*a* and to display the default values in the "Print Setup" screen 1400. The example in FIG. 14 corresponds to the print settings in FIG. 10. The default data to be read out is determined in a process shown in FIG. 13.

Referring to FIG. 13, when a request for acquisition of the default values is submitted with a display unit, i.e., on the Print Setup screen in FIG. 14 (or when the computer is started up for the first time after the installation) in Step S1301, then in Step S1302, a determining unit determines whether the default values specified (customized) by the user are stored in the UPD file 1000 in a storage unit (the external memory 11). The determination is performed by referring to the ID stored in the ID definition section 902. If the default values customized by the user are stored, in Step S1303, the process reads the customized default values. In Step S1304, the process copies the read default values in the print setup information 2041*a* and displays the read default values in the "Print Setup" screen 1400 in FIG. 14. If the default values customized by the user are not stored in Step S1302, then in Step S1305, the process reads factory default values, which are set and stored in advance and are not customized. In Step S1304, the process copies the read factory default values in the print setup information 2041*a* and displays the read factory default values in the "Print Setup" screen 1400 in FIG. 14. The determination in Step S1302 is based on whether the ID corresponding to the customized data is defined in the ID definition section 902 in the UPD file 1000, described above in "Content of UPD File" with reference to FIG. 9. If the ID corresponding to the customized data is defined in the ID definition section 902, the process determines that the default values specified by the user exist.

The printer driver refers to the default values that are customized or the default values that are not customized as the print setup information in the manner described above. After the reference, the printer driver creates a print command in accordance with the default values and performs the printing, unless the print setup information is changed.

Advantages of Printer Driver According to Exemplary Embodiment

Consequently, it is possible to customize the default values (initial values) of the print setup information set at the installation of the printer driver. In addition, it is possible to compare the customized default values with the configuration of the printer to be used. Furthermore, it is also possible to use the customized default values independently of the configuration of the printer to be used.

Other Embodiments

The printer driver according to the above exemplary embodiment of the present invention may be replaced with the driver of a peripheral device. In other words, the present invention is not limited to the printer driver and is applicable to a device driver, with which the user can set the operational configuration information and can customize the settable items and the default values (initial values) in the operational configuration information.

The present invention is applicable to a system including multiple apparatuses (for example, a host computer, interface devices, a reader, and a printer) or to an apparatus (for example, a copier or facsimile apparatus) including one device. The present invention can be embodied by supplying a storage medium (or a recording medium) having program code (software) realizing the functions according to the above embodiment to a system or an apparatus, the computer (or the CPU or the micro processing unit (MPU)) in which system or apparatus reads out and executes the program code stored in the storage medium. In this case, the program code itself read out from the storage medium realizes the functions of the embodiment described above. The present invention is applicable to the program code itself and the storage medium having the program code stored therein.

The computer that executes the readout program code realizes the functions of the embodiment described above. In addition, the operating system (OS) or the like running on the computer may execute all or part of the actual processing based on instructions in the program code to realize the functions of the embodiment described above. Alternatively, after the program code read out from the storage medium has been written in a memory that is provided in an expansion card included in the computer or in an expansion unit connected to the computer, the CPU or the like in the expansion card or the expansion unit may execute all or part of the actual processing based on instructions in the program code to realize the functions of the embodiment described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-095696 filed Mar. 29, 2005, which is hereby incorporated by reference herein in its entirety.

What is claimed is:

1. An information processing apparatus in which a device driver program for controlling a device and including operational configuration information is set, the information processing apparatus comprising:
    a storage unit for storing customization information which is set by a driver customization tool and indicates whether consistency between the operational configuration information and actual device configuration information of the device is to be verified before installation of the driver program;
    an acquiring unit that acquires the actual device configuration information from the device when the stored customization information indicates that consistency between the operational configuration information and the actual device configuration information of the device is to be verified before installation of the driver program, and not to acquire the actual device configuration information from the device when the customization information does not indicate that consistency between the operational configuration information and the actual device configuration information of the device is to verified before installation of the driver program;
    a verifying unit that verifies consistency between the operational configuration information and the actual device configuration information acquired by the acquiring unit, upon installation of the device driver program in the information processing apparatus when the customization information indicates that consistency between the operational configuration information and the actual device configuration information of the device is to be verified; and
    a warning unit that transmits a warning message to a user if the verifying unit verifies that there is no consistency between the operational configuration information and the actual device configuration information.

2. The information processing apparatus according to claim 1, further comprising:
    a comparing unit that determines if the operational configuration information that is set and held in advance coincides with the actual device configuration information,
    wherein the information processing apparatus causes the verifying unit to operate if the comparing unit determines that the operational configuration information coincides with the actual device configuration information.

3. The information processing apparatus according to claim 1,
    wherein the customization information is described in a driver set including the device driver program.

4. The information processing apparatus according to claim 1,
    wherein the warning unit transmits the warning message to the user at a destination that is set in advance if the verifying unit verifies that there is no consistency between the operational configuration information and the actual device configuration information.

5. An information processing method for an information processing apparatus in which a device driver program for controlling a device and including operational configuration information is set, the information processing method comprising:

storing customization information which is set by a driver customization tool and indicates whether consistency between the operational configuration information and actual device configuration information of the device is to be verified before installation of the driver program;

acquiring the actual device configuration information from the device when the stored customization information indicates that consistency between the operational configuration information and the actual device configuration information of the device is to be verified before installation of the driver program, and not to acquire the actual device configuration information from the device when the customization information does not indicate that consistency between the operational configuration information and the actual device configuration information of the device is to be verified before installation of the driver program;

verifying consistency between the operational configuration information and the acquired actual device configuration information upon installation of the device driver program in the information processing apparatus when the stored customization information indicates that consistency between the operational configuration information and the actual device configuration information of the device is to be verified; and transmitting a warning message to a user if it is determined that there is no consistency between the operational configuration information and the acquired actual device configuration information.

6. A computer-readable storing medium having stored thereon a device driver program comprising computer-executable instructions for controlling a device and including operational configuration information readable by a computer, the device driver program performing a method comprising:

storing customization information indicating whether consistency between the operational configuration information and actual device configuration information of the device is to be verified before installation of the driver program;

acquiring the actual device configuration information from the device when the customization information indicates that consistency between the operational configuration information and the actual device configuration information of the device is to be verified before installation of the driver program, and not to acquire the actual device configuration information from the device when the customization information does not indicate that consistency between the operational configuration information and the actual device configuration information of the device is to be verified before installation of the driver program;

verifying consistency between the operational configuration information and acquired actual device configuration information upon installation of the device driver program in the computer when the stored customization information indicates that consistency between the operational configuration information and the actual device configuration of the device is to be verified; and transmitting a warning message to a user if it is determined that there is no consistency between the operational configuration information and the acquired actual device configuration information.

\* \* \* \* \*